(12) United States Patent
Andersen et al.

(10) Patent No.: US 8,296,327 B2
(45) Date of Patent: Oct. 23, 2012

(54) SHORT PATHS IN WEB GRAPHS WITH SMALL QUERY TIME

(75) Inventors: Reid Andersen, Seattle, WA (US); Kumar Chellapilla, Sammamish, WA (US); Chinmay Karande, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 364 days.

(21) Appl. No.: 12/473,706

(22) Filed: May 28, 2009

(65) Prior Publication Data

US 2010/0306216 A1 Dec. 2, 2010

(51) Int. Cl.
*G06F 17/30* (2006.01)
(52) U.S. Cl. ....................................... 707/798
(58) Field of Classification Search .......... None
See application file for complete search history.

(56) References Cited

U.S. PATENT DOCUMENTS

| | | | |
|---|---|---|---|
| 6,470,383 B1 | 10/2002 | Leshem et al. | |
| 6,477,515 B1* | 11/2002 | Boroujerdi et al. | 706/14 |
| 6,549,896 B1 | 4/2003 | Candan et al. | |
| 6,717,920 B1 | 4/2004 | Cheng | |
| 7,016,307 B2 | 3/2006 | Vasudev et al. | |
| 2004/0148275 A1* | 7/2004 | Achlioptas | 707/3 |
| 2006/0047421 A1 | 3/2006 | Goldberg et al. | |
| 2007/0156330 A1 | 7/2007 | Goldberg et al. | |
| 2007/0266144 A1* | 11/2007 | Bollen et al. | 709/224 |
| 2008/0122848 A1 | 5/2008 | Goldberg et al. | |
| 2008/0155119 A1* | 6/2008 | Imamura et al. | 709/241 |
| 2008/0243811 A1* | 10/2008 | He et al. | 707/5 |
| 2009/0040931 A1* | 2/2009 | Bast et al. | 370/238 |
| 2010/0100569 A1* | 4/2010 | Alexander, Jr. | 707/798 |

OTHER PUBLICATIONS

"A Survey of Models of the Web Graph," by Bonato, Anthony (2005). Available at: SpringerLink.*
"A Faster and Simpler Fully Dynamic Transitive Closure," by Roditty, Liam. In: SODA '03 Proc. of the 14th Annual ACM-SIAM Symposium on Discrete Algorithms (2003). Available at: ACM.*
"Identification of Clusters in the Web Graph Based on Link Topology," by Huang & Lai. In: Proc. of the 7th Int'l Database Engineering and Applications Symposium (2003). Available at: IEEE.*
"Algorithms for Centrality Indices," by Jacob et al. In: Network Analysis, LNCS 3418, pp. 62-82 (2005). Available at: SpringerLink.*
"Directed Scale-Free Graphs," by Bollobas et al (2003). Available at: ACM.*
"Intentional Walks on Scale Free Small Worlds," by Puniyani et al. (2001). Available at: http://arxiv.org/abs/cond-mat/0107212 Last visited: Jul. 20, 2011.*

(Continued)

*Primary Examiner* — Neveen Abel Jalil
*Assistant Examiner* — Daniel Kinsaul
(74) *Attorney, Agent, or Firm* — Mayer & Williams P.C.

(57) ABSTRACT

Short paths are found with a small query time in scale-free directed graphs using a two-phase process by which data structures comprising shortest path trees are first pre-computed for a group of central vertices called "hubs" that have short paths to most other vertices in the graph. In a query time phase, a short path between two vertices of interest in the graph is found by looking up the path to the root in each of the shortest path trees.

18 Claims, 10 Drawing Sheets

OTHER PUBLICATIONS

"Two-point Euclidean shortest path queries in the plane," by Chiang & Mitchell. In: Proceedings of the tenth annual ACM-SIAM symposium on Discrete algorithms (1999). Available at: ACM.*

"Scale-free topology of e-mail networks," by Ebel et al. In: Phys. Rev. E 66 (2002). Available at: http://arxiv.org/abs/cond-mat/0201476 (last visited Jun. 27, 2012).*

Claffy, et al., "Macroscopic Internet Data Measurement and Analysis", Retrieved at <<http://www.caida.org/funding/nms/proposal.xml>>, Apr. 11, 2008, pp. 1-35.

Broder, et al., "Graph Structure in the Web", Computer Networks: The International Journal of Computer and Telecommunications Networking, Retrieved at <<http://www.cis.upenn.edu/~mkearns/teaching/NetworkedLife/broder.pdf>>, vol. 33, No. 1-6, Jun. 2000, pp. 15.

Bharat, et al., "Who Links to Whom: Mining Linkage between Web Sites", Proceedings of the 2001 IEEE International Conference on Data Mining, Retrieved at <<http://people.csail.mit.edu/ruhl/papers/2001-icdm.pdf>>, 2001, pp. 1-8.

Yen, et al., "Design and Evaluation of Improvement Method on the Web Information Navigation—A Stochastic Search Approach", Proceedings of the 36th Hawaii International Conference on System Sciences, Retrieved at <<http://ieeexplore.ieee.org/iel5/8360/26341/01174476.pdf?arnumber=1174476>>, Jan. 6-9, 2003, pp. 10.

Goldberg, et al., "Computing the Shortest Path: A* Search Meets Graph Theory", Proceedings of the sixteenth annual ACM-SIAM symposium on Discrete algorithms, Retrieved at <<http://avglab.com/andrew/pub/soda05.pdf>>, Jan. 23-25, 2005, pp. 10.

* cited by examiner

SHORT PATHS IN WEB GRAPHS WITH SMALL QUERY TIME

BACKGROUND

Since the early 1990's, the World Wide Web (the "web") has grown exponentially to include billions of web pages. Web analytics is the collection and analysis of web data in order to optimize user experiences and the usage of the web. The application of web analytics can help providers and content developers understand the dynamics of the web and gain insights into how visitors interact with their websites.

Web graph analysis typically involves the study of the patterns of links between web pages through the application of graph theory in which the links represent edges and the pages represent vertices (or nodes) in the graph. Finding the shortest path between vertices in a web graph is a common problem having applications, for example, to computer networking, web searching, Internet security, online applications such as social networking, and various types of computations and analyses.

While the shortest path problem has been widely studied, existing path finding techniques often scale poorly when applied to web graphs which may have billions of vertices. In particular, some existing techniques can be expensive in terms of processing time when running a query to find the shortest path between two given vertices. Other existing techniques may provide more reasonable query times but may be expensive in terms of storage and/or memory overhead. And some techniques may be reasonably well suited to finding short paths in planar networks (such as those used in mapping and direction-finding applications), but do not perform well with web graphs and other graphs that may have extremely high degree nodes (i.e., those nodes that have a relatively large number of edges to and from them).

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Short paths are found with a small query time in scale-free directed graphs using a two-phase process by which data structures comprising shortest path trees are first pre-computed for a group of central vertices called "hubs" that have short paths to most other vertices in the graph. In a query time phase, a short path between two vertices of interest in the graph is found by looking up the path to the root in each of the shortest path trees.

In an illustrative example, the hubs in a web graph can be identified using the degree of the vertices or by determining the importance of vertices through the application of link analysis techniques such as PageRank. Paths starting at these hubs will take advantage of the connectivity properties of the web graph whose degree distribution typically follows a power law. As web graphs are directed graphs, two shortest path trees are pre-computed for each hub—both an in-tree, containing shortest paths to the hub, and an out-tree, containing shortest paths from the hub.

At query time, a path query comprising two vertices u and v is handled by looking up the shortest path from u to the hub in each in-tree in which u appears and the shortest path from the hub to v in each out-tree in which v appears. Trail vertices for u are created which comprise the set of vertices along each shortest path from u to the hub. Trail vertices are also created for v comprising the set of vertices along each shortest path from the hub to v. Intersections in the shortest path trees are located by testing for any vertex x that appears as both a trail vertex for u and a trail vertex for v. For each such vertex x, a short path from u to v is generated by combining the paths from u to x and from x to v. The lengths of each of the resulting paths are computed and the shortest one is output in response to the path query. The path query can be answered in nearly constant time (i.e., O(1) time) as the depth of pre-computed shortest path trees are empirically observed to be small, particularly when the hubs are well chosen.

In those cases where the present short path finding process does not find the exact shortest path between the vertices in the query, it can compute a path length that represents an upper bound on the shortest path (i.e., the exact shortest path will not be longer than the computed path length). Once the upper bound is determined, a more expensive path finding technique, such as breadth first search ("BFS") can be utilized to find the exact shortest path. Overall query times in this combined approach will be shorter than using BFS or other conventional technique for the entire shortest path search.

The present short path finding process may run on a server that supports a web graph service. The service can be configured as a back-end server to support the internal operations of an enterprise or be utilized to support a front-end web analytics service, for example. Applications of the present process can include analysis of scale-free directed graphs like web graphs as well as graphs associated with other complex networks that exhibit power log distribution such as social networks and communication networks.

Advantageously, in a directed graph G=(V,E) where V is the vertex set and E is the set of edges, the shortest path trees can be stored using O(|V|) memory. When answering a shortest path query, only the shortest path trees need to be accessed and not the entire directed graph G. This makes both the pre-computation and query time phases highly scalable and avoids limitations due to large memory requirements. When applied, the present process has empirically yielded a speed-up in query time of up to three orders of magnitude compared with the BFS technique that stores all explored vertices of searched graph in-memory.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings.

DETAILED DESCRIPTION

Figure 1:
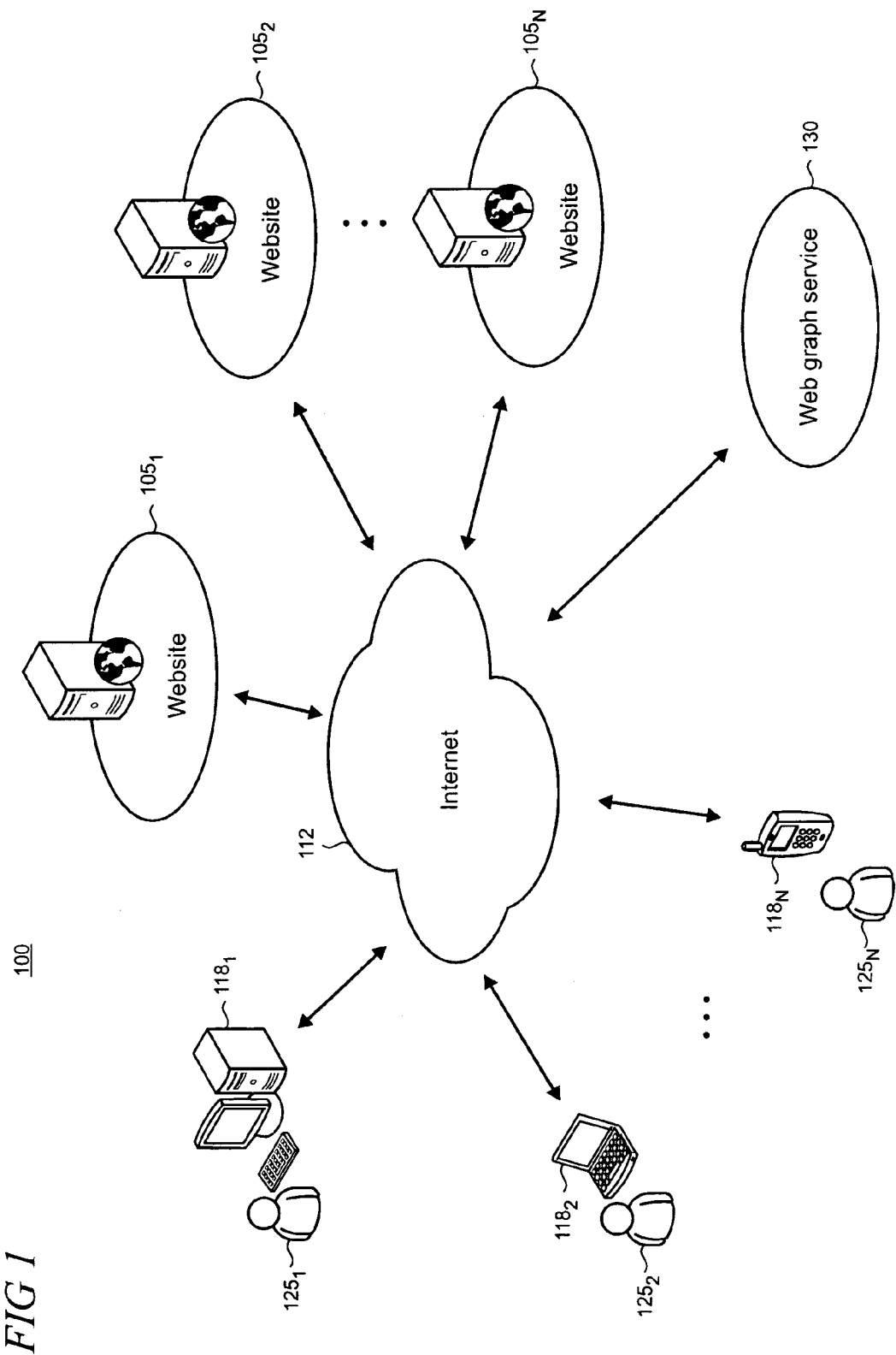
FIG. 1 shows an illustrative networked computing environment in which the present short path finding process may be utilized.

FIG. 1 shows an illustrative networked computing environment 100 in which the present two-phase short path finding process may be utilized. The environment includes multiple websites $105_{1, 2 \ldots N}$ that are accessible over a network such as the Internet 112 by client computing devices $118_{1, 2 \ldots N}$ that are operated by respective users $125_{1, 2 \ldots N}$. The websites 105 include servers which serve web pages that may be associated with any of a variety of services, applications, resources, etc. Web pages are documents that can contain text, images, audio, video, and/or other multimedia as well as hyperlinks to other pages.

The client computing devices 118 may include any of a variety of platforms such as desktop and laptop PCs (personal computers), workstations, game consoles, as well as devices like smartphones, mobile phones, handheld computers, and the like. A user 125 will typically access a web page through a browser, for example, Microsoft Internet Explorer® or Internet Explorer Mobile that runs on a client computing device 118.

Figure 2:
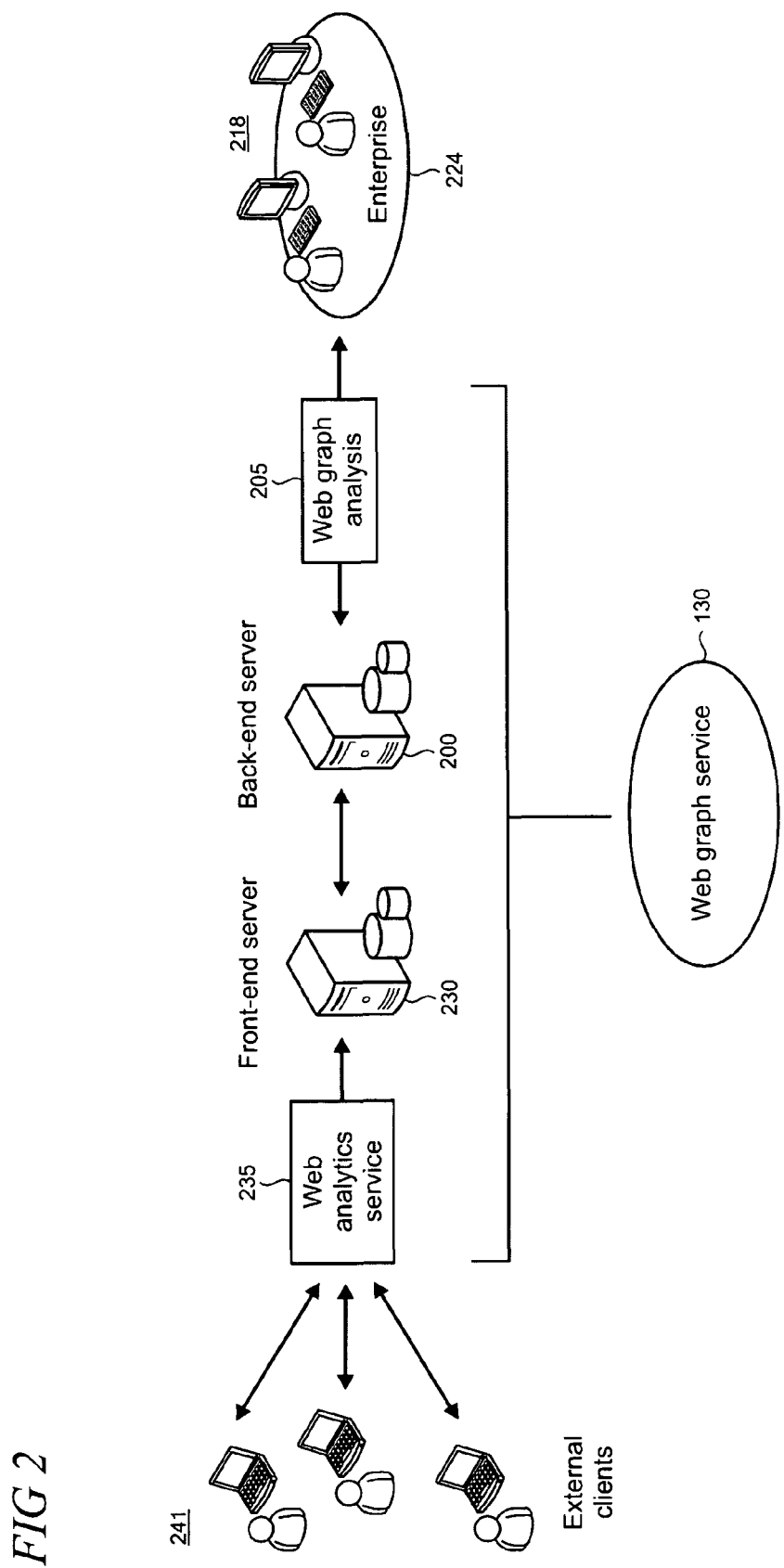
FIG. 2 shows details of an illustrative web graph service.

The networked computing environment 100 also supports a web graph service 130. As shown in FIG. 2, the web graph service 130 illustratively includes one or more computing platforms such as a server 200 that is configured to store web graphs upon which the present two-phase short path finding process is run. In particular, the servers run software code that, when executed, return short paths between specified pairs of vertices in a graph, such as web pages, with a small query time.

The server 200 can be configured as a back-end server (i.e., one that does not have direct connections to the outside world, external processes, services, users, etc.) to expose web graph analysis using the two-phase short path finding process (indicated by reference numeral 205) to users 218 in an enterprise 224 such as a search provider or other entity that engages in usage analysis of the web and/or the Internet. In alternative embodiments, the server 200 may be operatively coupled to a front-end server 230 (or be integrated as part of the front-end server) that includes web graph analysis as part of a web analytics service 235 that may be exposed to external clients or entities 241.

Figure 3:
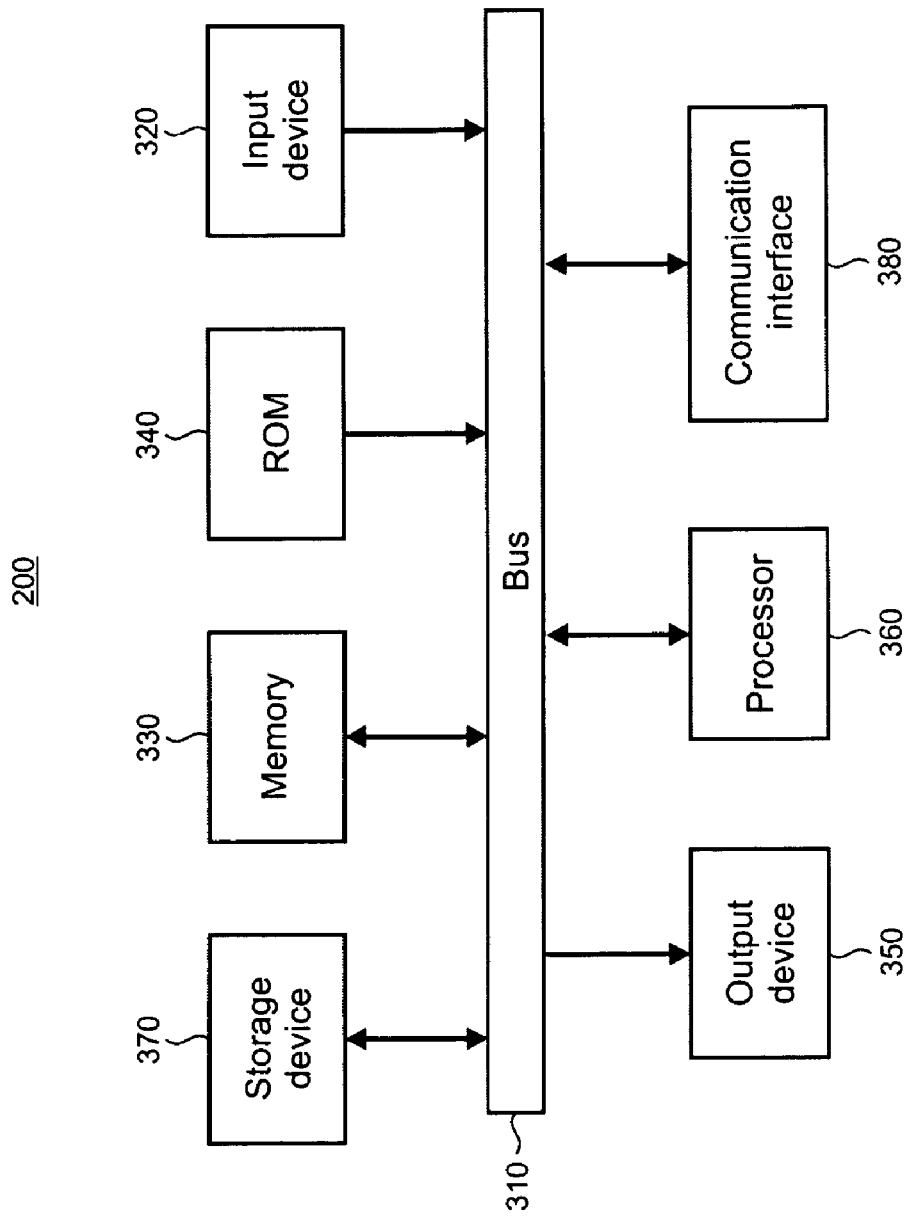
FIG. 3 is a simplified functional block diagram of an illustrative computing platform that is supported by the web graph shown in FIG. 2.

FIG. 3 is a simplified functional block diagram of an illustrative computing platform or other electronic device such as the server 200 (FIG. 2). The server 200 is configured with a variety of components including a bus 310, an input device 320, a memory 330, a read only memory ("ROM") 340, an output device 350, a processor 360, a storage device 370, and a communication interface 380. Bus 310 will typically permit communication among the components of the server 200.

Processor 360 may include at least one conventional processor or microprocessor that interprets and executes instructions. Memory 330 may be a random access memory ("RAM") or another type of dynamic storage device that stores information and instructions for execution by processor 360. Memory 330 may also store temporary variables or other intermediate information used during execution of instructions by processor 360. ROM 340 may include a conventional ROM device or another type of static storage device that stores static information and instructions for processor 360. Storage device 370 may include compact disc ("CD"), digital versatile disc ("DVD"), a magnetic medium, or other type of computer-readable storage device for storing data and/or instructions for processor 360.

Input device 320 may include a keyboard, a pointing device, or other input device. Output device 350 may include one or more conventional mechanisms that output information, including one or more display monitors, or other output devices. Communication interface 380 may include a transceiver for communicating via one or more networks via a wired, wireless, fiber optic, or other connection.

The server 200 may perform such functions in response to processor 360 executing sequences of instructions contained in a tangible computer-readable medium, such as, for example, memory 330, ROM 340, storage device 370, or other medium. Such instructions may be read into memory 330 from another machine-readable medium or from a separate device via communication interface 380.

Figure 4:
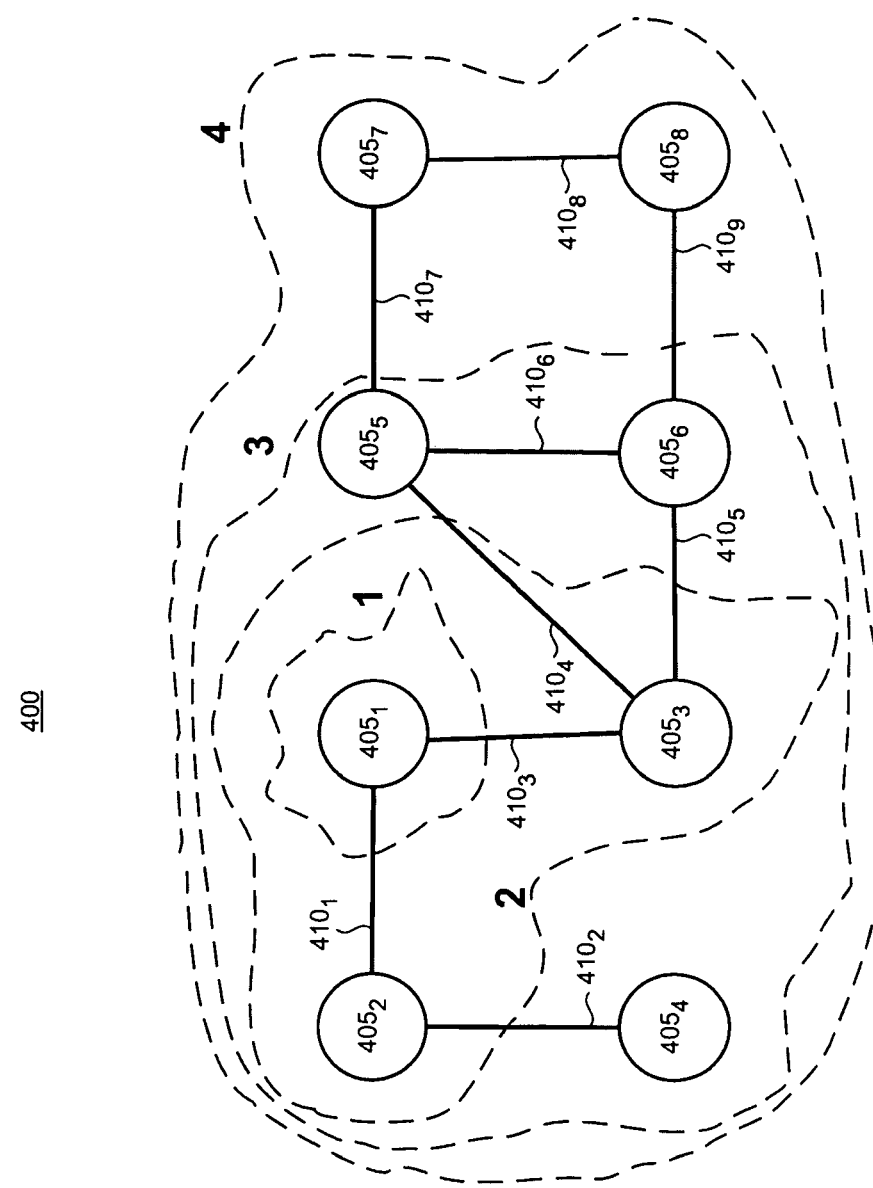
FIG. 4 shows an illustrative graph to which a conventional breadth-first search technique is applied.
Figure 4:
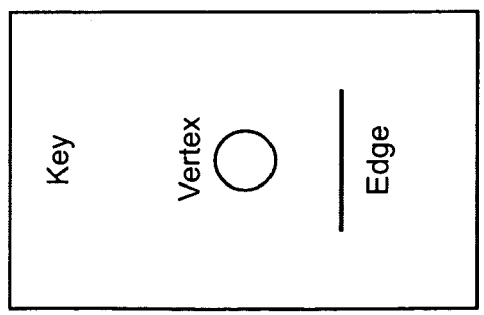

Turning now to an exposition of the present process for finding short paths in a graph with small query time, a short discussion of conventional path finding techniques is first presented. FIG. 4 shows an illustrative graph 400 to which the BFS algorithm is applied. Vertices $405_{1 \ldots 8}$ are coupled via edges $410_{1 \ldots 9}$ as shown. In a web graph, the vertices represent static HTML (HyperText Markup Language) pages, and the edges represent hyperlinks among the web pages. It is emphasized that although eight vertices are shown in the drawing for the sake of clarity of illustration, the underlying network of objects which the graph 400 represents can contain virtually any number of vertices and edges. As noted above, for example, the World Wide Web is believed to contain billions of pages and links.

BFS involves traversal through a graph in a manner that touches all the vertices reachable from a particular source vertex. The traversal is ordered in a way that all of the neighbors of a vertex are explored before proceeding on to the neighbors of the neighbors. Thus, BFS expands like a wave moving in a pool of water. Vertices in the same wave are the same distance from the source vertex.

In the example shown in FIG. 4, vertex $405_1$ is the source vertex in wave 1. In wave 2, vertices $405_2$ and $405_3$ are discovered as one hop away from the source vertex $405_1$. In wave 3, vertices $405_4$, $405_5$, and $405_6$ are discovered as two hops away from the source vertex $405_1$. In wave 4, vertices $405_7$ and $405_8$ are discovered as three hops away from the source vertex $405_1$.

In comparison to the BFS technique where all the explored vertices are stored in memory, the present short path finding process utilizes two phases—a pre-processing phase and the query time phase. As described in more detail below, the two-phase process both reduces the storage/memory requirements and yields a speed-up when generating an answer to a path query.

Figure 5:
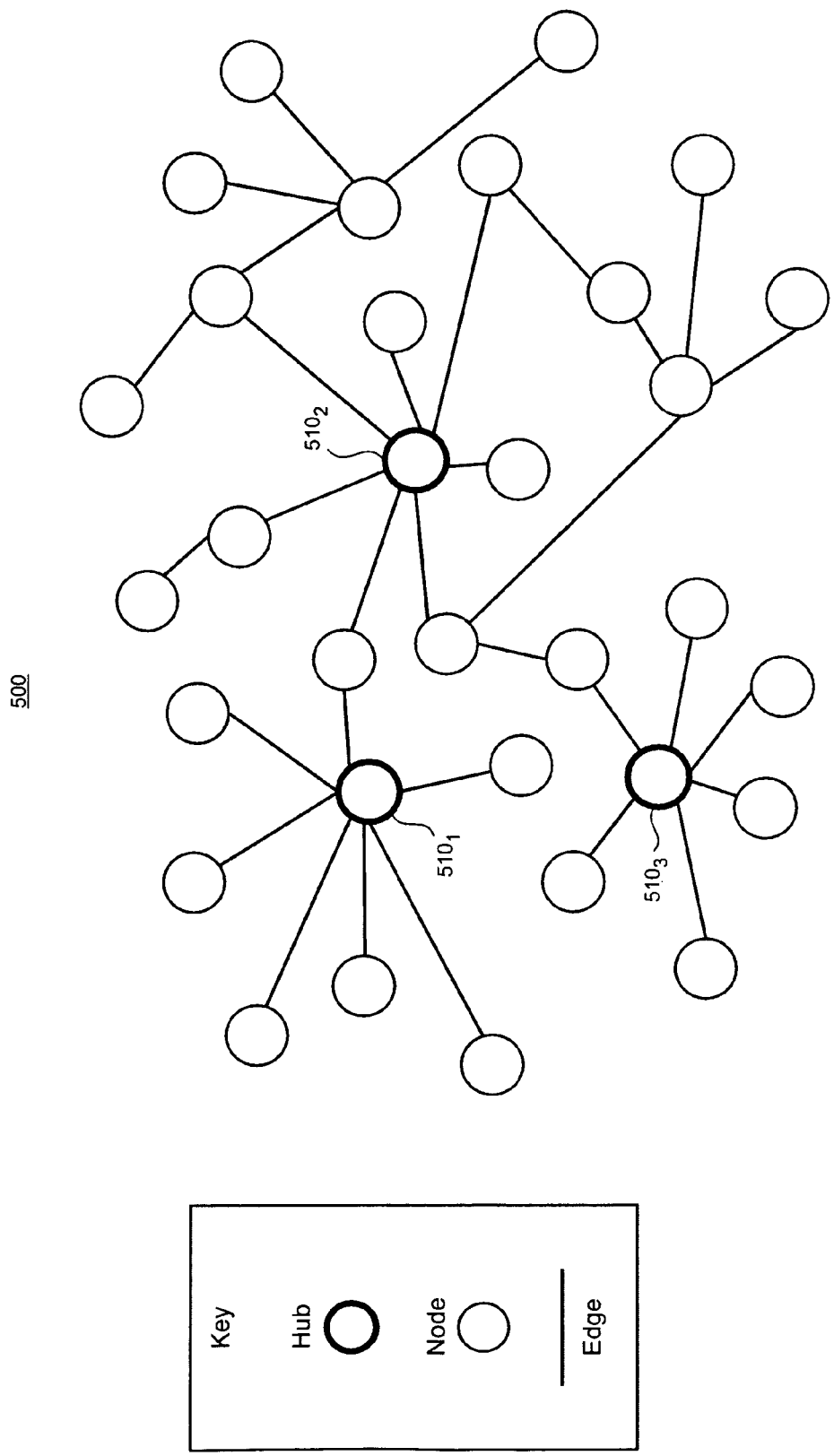
FIG. 5 shows an illustrative scale-free graph including vertices and edges, as well as specialized vertices called "hubs"

The present process makes use of the recognition that the World Wide Web and other network types (e.g., social networks, communication networks, etc.) may be characterized as scale-free networks whose degree distribution follow a power log. As shown in FIG. 5, an illustrative scale-free network has a web graph 500 that is characterized by a number of vertices with a degree that exceeds the average. As above, the web graph 500 includes an arbitrary number of vertices and edges for the sake of clarity in illustration. However, it is emphasized that the present short path finding process is not limited to graphs of any particular size.

These high-degree vertices are typically centralized in that they have short paths to most other vertices in a graph and are referred to here as "hubs" (as indicated by reference numerals $510_{1\ldots3}$). In other words, the connectivity properties of the web graph 500 are well captured by paths starting at these hubs. By pre-computing short path trees between a small number of hubs, a short path between two given vertices may be quickly found by looking up the path to the root in each of the shortest path trees.

Figure 6:
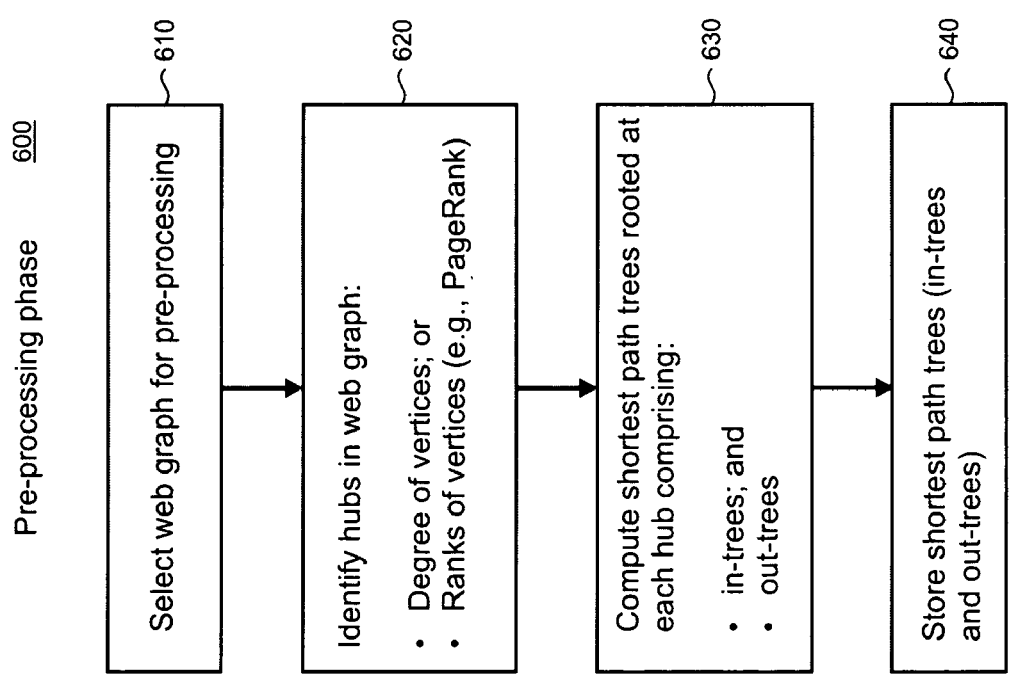
FIG. 6 shows a pre-processing phase of an illustrative process for finding short paths in a graph.

As shown in FIG. 6, the pre-processing phase 600 includes selecting a graph for processing which, in this illustrative example, is a web graph (610). The hubs in the web graph are identified (620) using one of a variety of techniques. For example, the hubs in the web graph may be identified using the degree of vertices in the graph, or by looking at the rank or "importance" of the vertices through application of a conventional link analysis algorithm such as PageRank. The specific number of hubs identified for any given web graph can vary by implementation.

The shortest path trees rooted at each hub are computed (630). Web graphs are directed graphs (i.e., the graph edges are directed edges having a unique direction for example, a hyperlink uv contained in vertex u that links vertex v to u). Thus, each hub will have an in-tree and an out-tree. An in-tree includes the shortest paths directed to the hub, and an out-tree contains the shortest paths directed from the hub. The shortest path trees for each hub (including both in-trees and out-trees) are stored as pre-computed data structures (640) which are made accessible to the query time phase of the short path finding process, as described below in the text accompanying FIG. 10.

Figure 7:
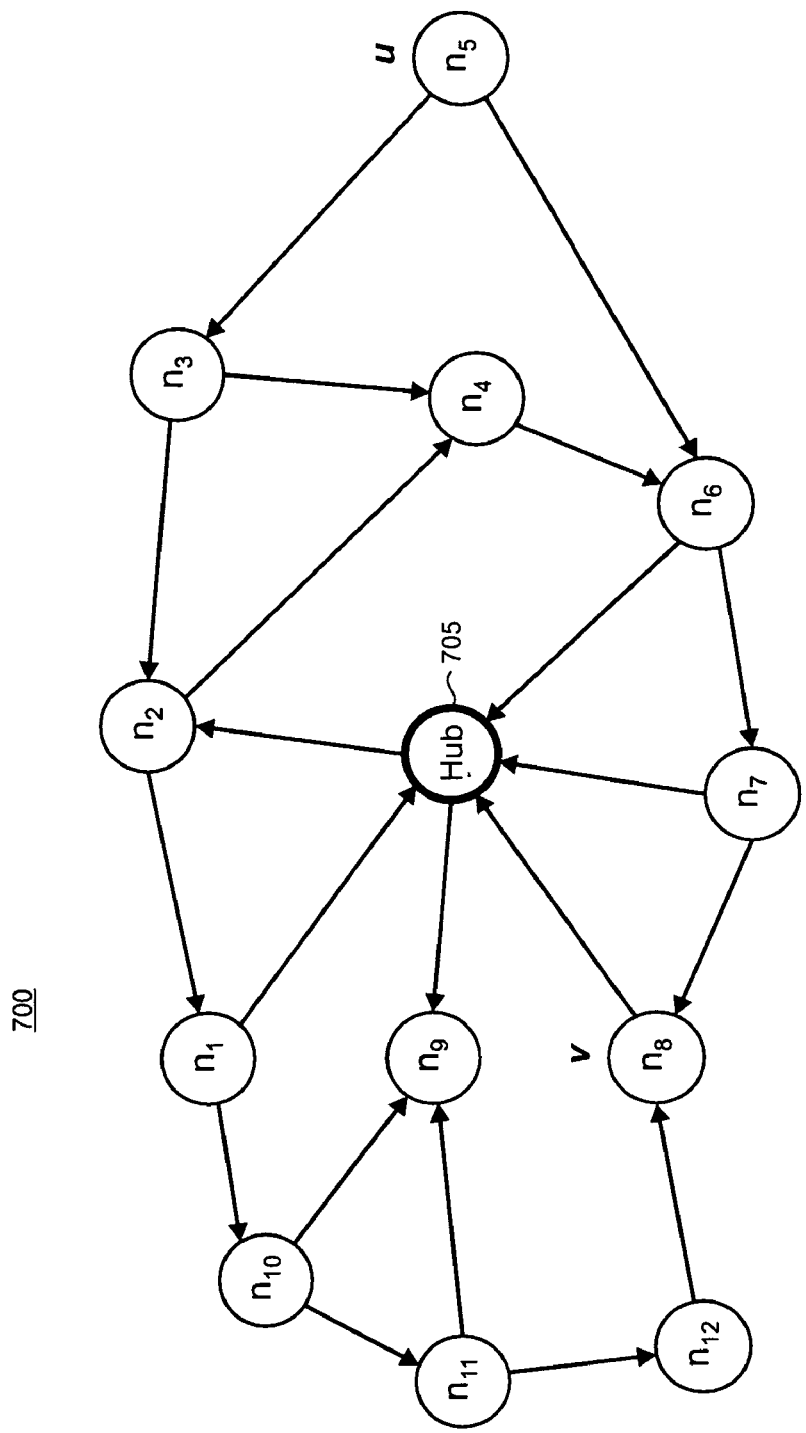
FIG. 7 shows an illustrative directed web graph to which the present two-phase process for finding short paths is applied.

The generation of a representative in-tree and out-tree is illustrated using the subgraph 700 shown in FIG. 7. The subgraph 700 is intended to show an exemplary hub 705 among all of the identified hubs from step 620 in FIG. 6. That is, additional subgraphs (which are not shown) would be associated with other respective hubs in the web graph. The subgraph 700 has 12 vertices in this example (referred to as "nodes" $n_{1\ldots12}$) which are connected via various directed edges or hyperlinks as indicated by the arrows.

In this example, subgraph 700 is an unweighted graph. However, weighted graphs may be used in some implementations. For example in the case of a web graph, the pages and/or hyperlinks may be weighted by subject matter, topic, or other criteria. It is noted that this particular subgraph 700 is selected to highlight the principles of the present two-phase short path finding process, so it would be anticipated, of course, that a particular subgraph utilized with a given implementation will vary from what is shown here.

Figure 8:
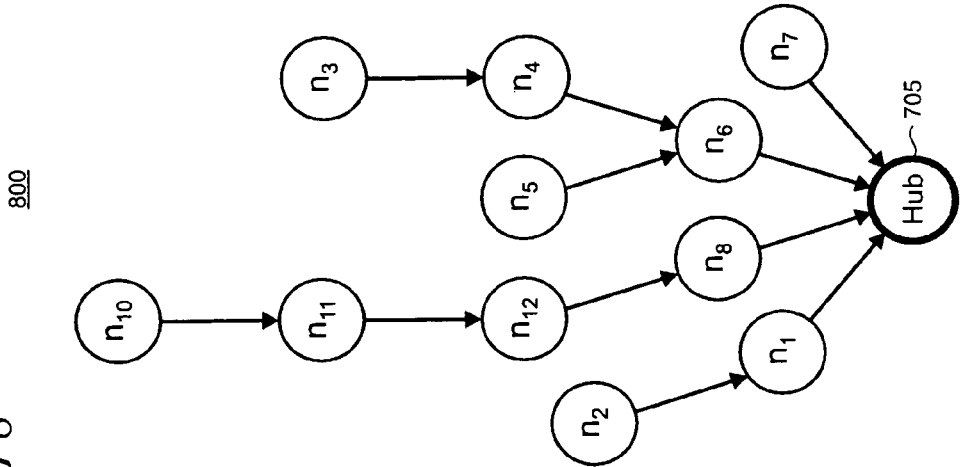
FIG. 8 shows an illustrative pre-computed data structure comprising an in-tree for the nodes to the hub in the directed web graph.

FIG. 8 shows an in-tree 800 to the hub 705 that may be generated using BFS or other appropriate shortest path finding algorithm and then stored as a pre-computed data structure. As shown, nodes 1, 6, 7, and 8 are one hop away from the hub 705 in this example. Nodes 2, 4, 5, and 12 are two hops away. Nodes 3 and 11 are three hops away while node 10 is four hops away from the hub 705.

Figure 9:
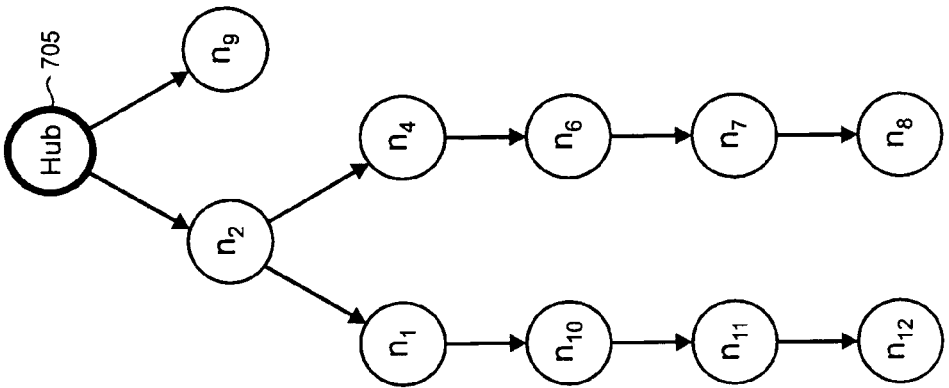
FIG. 9 shows a query times phase of the illustrative process for finding short paths in a graph.

FIG. 9 shows an out-tree 900 from the hub 705. As with the in-tree 800, the out-tree 900 may be generated using BFS or other algorithm then stored as a pre-computed data structure. As shown, nodes 2 and 9 are one hop away from the hub 705. Nodes 1 and 4 are two hops away, nodes 6 and 10 are three hops away, nodes 7 and 11 are four hops away, and nodes 8 and 12 are five hops away from the hub 705.

Similar shortest path trees are computed for all of the hubs in a given web graph and stored as pre-computed data structures. In a directed graph G=(V,E), the shortest path trees can be stored using O(|V|) memory. Typically, choosing good hubs has been empirically shown to lead to shortest path trees with the smallest depth which decreases both the memory requirement and lookup times during the query time phase.

Figure 10:
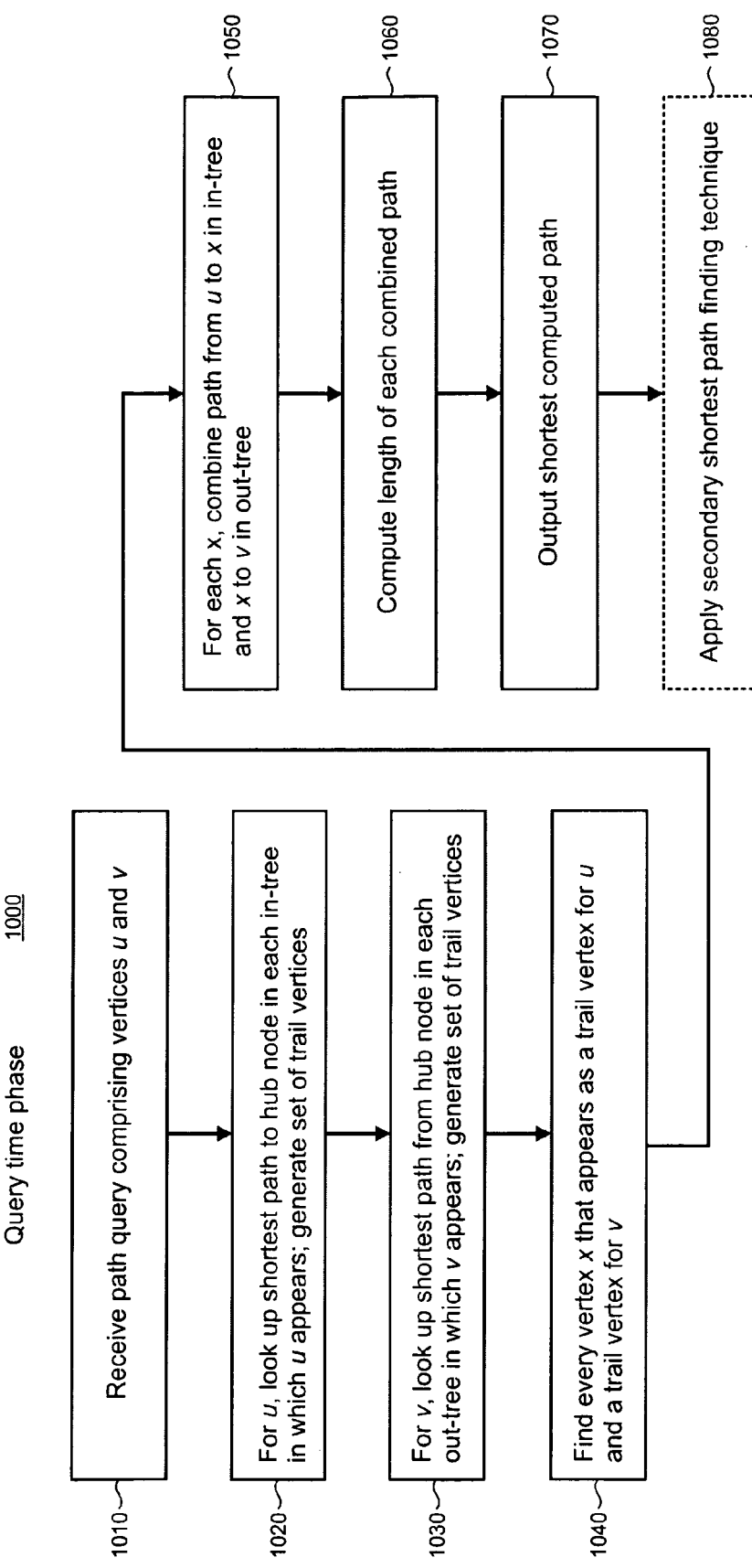
FIG. 10 shows an illustrative pre-computed data structure comprising an out-tree from the hub to the nodes in the directed web graph.

As shown in FIG. 10, the query time phase 1000 includes receiving a path query which consists of two vertices u and v for which a short path is desired to be found from u to v (1010). For the vertex u, a lookup is performed in each pre-computed in-tree in which u is found (recognizing that the vertices in the path query will not necessarily appear in every shortest path tree). The lookup will identify the shortest path from u to the hub 705 so that a set of trail vertices can be generated (1020) for each in-tree in which u appears. The set of trail vertices consists of all the vertices along the shortest path from u to the hub.

For the vertex v, a lookup is performed in each pre-computed out-tree in which v is found and a set of trail vertices is generated (1030). This set of trail vertices consists of all the vertices along the shortest path from the hub 705 to v.

Next, a test is performed to determine whether there is any vertex x that appears as both a trail vertex for u and a trail vertex for v (1040). In other words, vertex x is an intersection between the two shortest paths associated with a given hub (i.e., the path from u to the hub and the path from the hub to v). For each such vertex x, the paths from u to x and x to v are combined (1050). The length of each combined path is computed for each of the hubs (assuming that the vertices u and v are associated with more than one hub) (1060). The shortest computed path is output as an answer to the path query (1070).

The query time phase of the present short path finding process includes an optional step that may be applied in cases where the process does not find the exact shortest path between the vertices in the path query. As indicated by reference numeral 1080, the present process may be used to compute a path that represents an upper bound on the shortest path. Once an upper bound is determined, a conventional path finding algorithm may be applied as a secondary pass. In other words, the computed short path can identify the neighborhood of the shortest path and the secondary technique can then be applied to refine the computation and identify the exact shortest path. Using two passes with two different techniques can be expected to be less expensive than solely using the conventional path finding algorithm from the start.

Figure 11:
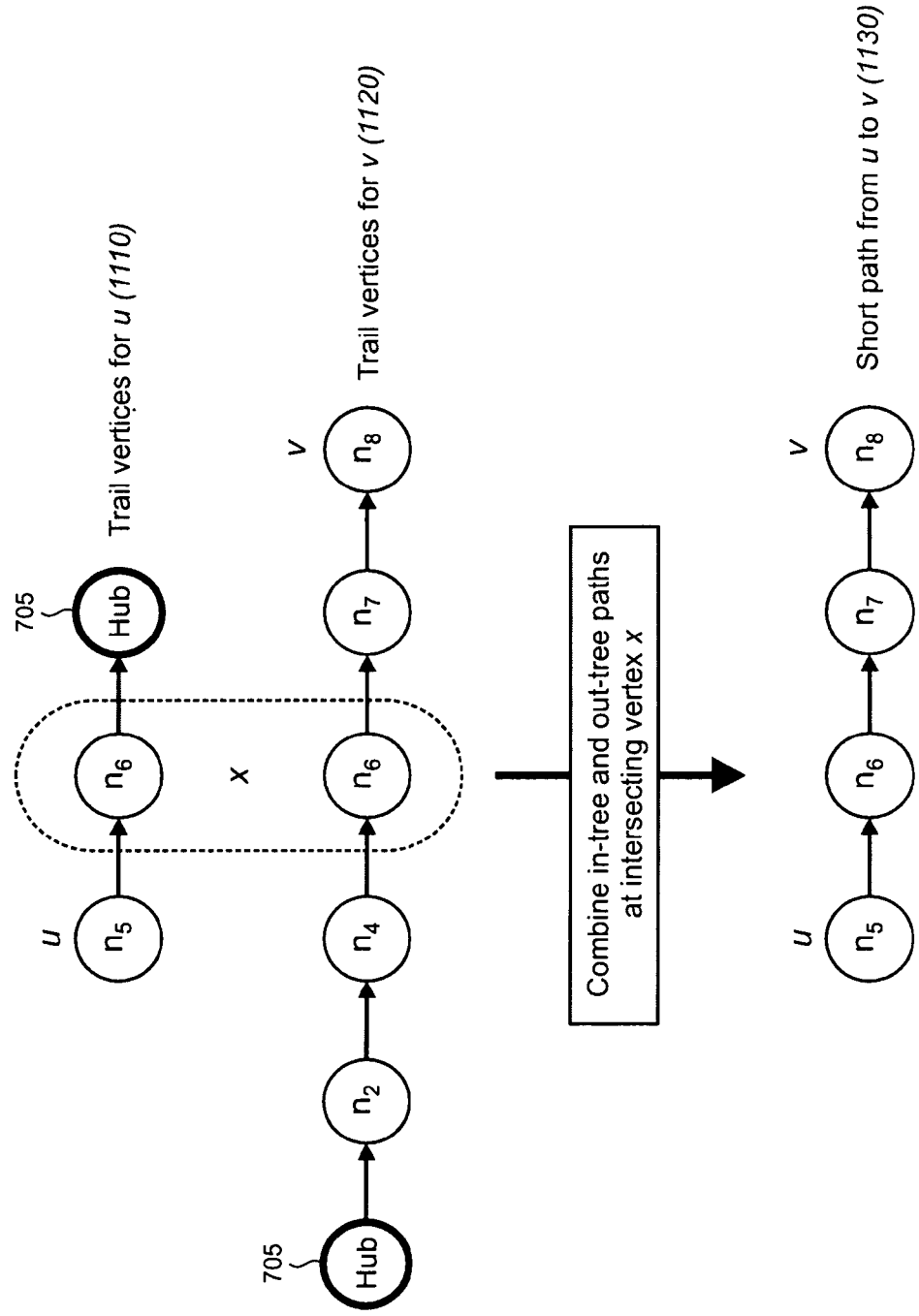
FIG. 11 is an illustrative diagram that shows the combination of in-tree and out-tree paths at an intersecting vertex x for generating short paths between two given vertices in the directed web graph.

FIG. 11 shows the application of the query time phase 1000 (FIG. 10) to the exemplary subgraph 700 shown in FIG. 7. As shown, assuming vertex u is node 5 in subgraph 700, then the trail vertices in the in-tree from u to the hub 705 comprise the single node 6, as indicated by reference numeral 1110. Assuming the vertex v is node 8 in subgraph 700, then the trail vertices in the out-tree from the hub 705 to v comprise nodes 2, 4, 6, and 7, as indicated by reference numeral 1120. Node 6 which is common to both sets of trail vertices is accordingly vertex x which acts as the point of intersection between the in-tree and out-tree paths. By combining the in-tree and out-tree paths at the intersecting vertex x a short path from u to v may be generated.

As shown in FIG. 11, the short path starts at node 5 (u) and runs through nodes 6 and 7 to reach node 8 (v), as indicated by reference numeral 1130. In this particular example, the short path uv is the exact shortest path in the subgraph 700.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer-readable storage media storing instructions which, when executed by one or more processors disposed in an electronic device, perform a method for computing short paths in a scale-free directed graph, the method comprising the steps of:

identifying by the one or more processors one or more hubs in the graph where the graph represents a communication network, the hubs being high-degree vertices;

pre-computing data structures for each of the one of more hubs, each of the pre-computed data structures comprising an in-tree and an out-tree, the in-tree including shortest paths directed from vertices in the graph to a given hub, the out-tree including shortest paths directed from the given hub to vertices in the graph, the pre-computing being performed prior to processing of a path query on the graph;

storing the pre-computed data structures;

when during the processing of the path query, an exact shortest path is not found, generating an upper bound on the exact shortest path;

once the upper bound is determined, performing a secondary path finding technique in the neighborhood of the short path in order to find the exact shortest path.

2. The one or more computer-readable storage media of claim 1 in which the method includes a further step of making the pre-computed data structures accessible during the processing of the path query.

3. The one or more computer-readable storage media of claim 1 in which the identifying comprises performing a PageRank algorithm on vertices and edges in the graph or analyzing the vertices' degree.

4. The one or more computer-readable storage media of claim 1 in which the graphs defined by G=(V,E) in which V is a set of vertices and E is a set of directed edges between the vertices and the storing is implemented using only O(|V|) memory.

5. The one or more computer-readable storage media of claim 1 including a further step of utilizing the pre-computed data structures to return a short path in response to the path query in approximately constant time.

6. The one or more computer-readable storage media of claim 5 in which the utilizing comprises finding a short path between two vertices specified in the path query by looking up a path to a hub in each of the pre-computed data structures.

7. The one or more computer-readable storage media of claim 1 in which the scale-free directed graph is associated with one of World Wide Web, social network, or communications network.

8. One or more computer-readable storage media storing instructions which, when executed by one or more processors disposed in an electronic device, perform a method for executing a path query on a scale-free directed graph G=(V,E) in which V is a set of vertices and E is a set of directed edges between the vertices, the method comprising the steps of:

receiving by one or more processors a path query specifying vertices u and v that define a short path search;

accessing a set of data structures, each of the data structures representing a shortest path tree including an in-tree and an out-tree that is associated with respective hubs in the graph where the graph represents a communication network, the hubs being identified as having short paths to other vertices in the graph and having a relatively high degree compared with an average degree for other vertices in the graph;

looking up a shortest path from u to a hub in each in-tree in which u appears and generating a set of trail vertices that are located on a path from u to the hub;

looking up a shortest path from the hub to v in each out-tree in which v appears and generating a set of trail vertices that are located on a path from the hub to v;

locating an intersecting vertex x that is common between the set of trail vertices for u and the set of trail vertices for v; and combining a path from u to x and a path from x to v to generate a short path from u to v;

generating an upper bound on an exact shortest path from u to v when the generated short path is not the exact shortest path; and performing a secondary path finding technique in the neighborhood of the short path in order to find the exact shortest path once an upper bound is determined.

9. The one or more computer-readable media of claim 8 in which the method includes a further step of computing lengths of all short paths from u to v that are associated with all the shortest path trees in which u and v appear.

10. The one or more computer-readable media of claim 9 in which the method includes a further step of outputting a shortest path from among the computed lengths of all the short paths.

11. The one or more computer-readable media of claim 8 in which the data structures are pre-computed in advance of the step of accessing.

12. The one or more computer-readable media of claim 8 in which the hubs are each associated with shortest path trees having relatively small depth.

13. The one or more computer-readable media of claim 8 in which the short path from u to v is generated by only accessing the set of data structures but not the entire graph G.

14. A machine-implemented method for providing a web graph service for executing a path query on a scale-free directed graph G=(V,E) in which V is a set of vertices and E is a set of directed edges between the vertices, the method comprising the steps of:

pre-computing by one or more processors short path trees for each of a selected group of central vertices within a scale-free directed graph where the graph represents a communication network, each of the central vertices being a root of respective pre-computed short path trees and having a relatively high degree compared with an average degree for other vertices in the graph;

receiving a path query comprising vertices u and v between which a short path is calculable;

performing lookups on the pre-computed short path trees to identify a path from u to a root and a path from the root to v;

generating a short path from u to v using the identified paths;

generating an upper bound on an exact shortest path from u to v when the generated short path is not the exact shortest path; and performing a secondary path finding technique in the neighborhood of the short path in order to find the exact shortest path once an upper bound is determined.

15. The machine-implemented method of claim 14 in which the generating comprises finding a common vertex of intersection x between the path from u to the root and the path from the root to v and combining a path from u to x with a path from x to v.

16. The machine-implemented method of claim 15 in which the pre-computed short path trees comprise an in-tree and an out-tree, the in-tree including shortest paths directed from vertices in the graph to a given root, the out-tree including shortest paths directed from the given root to vertices in the graph.

17. The machine-implemented method of claim 14 including a further step of iterating the generating step for each of the pre-computed short path trees in which u and v appear.

18. The machine-implemented method of claim 17 including the further steps of computing a length of each combined path resulting from the iterating step, and outputting a shortest computed path.

* * * * *